US012784230B2

(12) United States Patent
Xu et al.

(10) Patent No.: US 12,784,230 B2
(45) Date of Patent: Nov. 3, 2026

(54) SUBJECT-AWARE VIDEO BACKGROUND GENERATION

(71) Applicant: Adobe Inc., San Jose, CA (US)

(72) Inventors: Zhan Xu, San Jose, CA (US); Yang Zhou, Mountain View, CA (US); Krishna Kumar Singh, San Jose, CA (US); Jimei Yang, Mountain View, CA (US); Chun-hao Huang, London (GB); Boxiao Pan, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 18/788,712

(22) Filed: Jul. 30, 2024

(65) Prior Publication Data

US 2026/0038126 A1 Feb. 5, 2026

(51) Int. Cl.

| | |
|---|---|
| ***G06T 7/194*** | (2017.01) |
| ***G06T 3/40*** | (2024.01) |
| ***G06T 7/12*** | (2017.01) |
| ***G06T 7/20*** | (2017.01) |
| ***G06V 10/25*** | (2022.01) |
| ***G06V 10/44*** | (2022.01) |

(52) U.S. Cl.

CPC ................ *G06T 7/194* (2017.01); *G06T 3/40* (2013.01); *G06T 7/12* (2017.01); *G06T 7/20* (2013.01); *G06V 10/25* (2022.01); *G06V 10/44* (2022.01); *G06T 2207/20084* (2013.01)

(58) Field of Classification Search

CPC .. G06T 3/40; G06T 7/194; G06T 7/12; G06T 7/20; G06T 2207/20084; G06V 10/25; G06V 10/44; G06V 10/82

See application file for complete search history.

(56) References Cited

PUBLICATIONS

Wang W, Chen Y, Liu Y, Yuan Q, Yang S, Zhang Y. Mvoc: a training-free multiple video object composition method with diffusion models. arXiv preprint arXiv:2406. 15829. Jun. 22, 2024. (Year: 2024).*

Xue Z, Luo M, Chen C, Grauman K. HOI-Swap: Swapping Objects in Videos with Hand-Object Interaction Awareness. arXiv preprint arXiv:2406.07754. Jun. 11, 2024. (Year: 2024).*

Esser, Patrick, et al. "Structure and Content-Guided Video Synthesis with Diffusion Models." arXiv preprint arXiv:2302.03011 (2023). (Year: 2023).*

(Continued)

*Primary Examiner* — Tracy Mangialaschi

(74) *Attorney, Agent, or Firm* — FIG. 1 Patents

(57) ABSTRACT

In one implementation of subject-aware background video generation, a processing device generates mask data and foreground feature data from frames of a subject video. The mask data separates a subject depicted in the subject video from an environment therein. The foreground feature data describes the features of the subject. The processing device receives a condition frame that depicts a different environment. A machine-learning model generates a composite video by aligning the subject's movement with the different environment from inputs of the foreground feature data, the mask data, and the condition frame, which conditions the generation of the different environment for the composite video. The processing device then presents the composite video via a user interface.

20 Claims, 9 Drawing Sheets

(56) References Cited

PUBLICATIONS

Pan B, Xu Z, Huang CH, Singh KK, Zhou Y, Guibas LJ, Yang J. ActAnywhere: Subject-Aware Video Background Generation. arXiv preprint arXiv:2401.10822. Jan. 19, 2024. (Year: 2024).*
Adobe , "Firefly—Free Generative AI for creatives", Adobe, adobe.com, [retrieved from the internet on Oct. 3, 2024], <https://www.adobe.com/products/firefly.html>, 2024, 11.
Adobe , "Photoshop", Adobe, adobe.com, [retrieved from the internet on Oct. 21, 2024], <https://www.adobe.com/products/photoshop.html>, 2024, 9.
Bain, Max , et al., "Frozen in Time: A Joint Video and Image Encoder for End-to-End Retrieval", Cornell University, arXiv.org, [retrieved from the internet on Sep. 20, 2024], <https://arxiv.org/abs/2104.00650>, 2021, 15 pages.
Bar-Tal, Omer , et al., "Text2LIVE: Text-Driven Layered Image and Video Editing", Cornell University, arXiv Preprint, arxiv.org [retrieved Jan. 18, 2024]. Retrieved from the Internet <https://arxiv.org/pdf/2204.02491.pdf>, Apr. 5, 2022, 21 pages.
Blattmann, Andreas , et al., "Align your Latents: High-Resolution Video Synthesis with Latent Diffusion Models", Cornell University arXiv, arXiv.org [retrieved Aug. 9, 2023]. Retrieved from the Internet <https://arxiv.org/pdf/2304.08818.pdf>., Apr. 18, 2023, 44 Pages.
Brooks, Tim , et al., "Hallucinating Pose-Compatible Scenes", Cornell University, arXiv.org, [retrieved from the internet on Oct. 21, 2024], <https://arxiv.org/pdf/2112.06909>, Oct. 1, 2022, 29.
Ceylan, Duygu , et al., "Pix2Video: Video Editing using Image Diffusion", Proceedings of the IEEE/CVF International Conference on Computer Vision (ICCV) [retrieved Jan. 25, 2024]., Oct. 2023, 12 pages.
Chen, Weifeng , et al., "Control-A-Video: Controllable Text-to-Video Diffusion Models with Motion Prior and Reward Feedback Learning", Cornell University, arXiv.org, [retrieved from the internet on Sep. 20, 2024], <https://arxiv.org/pdf/2305.13840>, 2024, 20 pages.
Chen, Haoxin , et al., "VideoCrafter1: Open Diffusion Models for High-Quality Video Generation", Cornell University, arXiv.org, [retrieved from the internet on Sep. 20, 2024], <https://arxiv.org/pdf/2310.19512>, Oct. 30, 2023, 12.
Clark, Aidan , et al., "Adversarial Video Generation on Complex Datasets", Cornell University, arXiv.org, [retrieved from the internet on Oct. 21, 2024], <https://arxiv.org/pdf/1907.06571>, Sep. 25, 2019, 21.
Diba, Ali , et al., "Large Scale Holistic Video Understanding", Cornell University, arXiv.org, [retrieved from the internet on Oct. 21, 2024], <https://arxiv.org/pdf/1904.11451>, Dec. 15, 2020, 23.
Esser, Patrick , "Structure and Content-Guided Video Synthesis with Diffusion Models", Proceedings of the IEEE/CVF International Conference on Computer Vision (ICCV) [retrieved Feb. 1, 2024]., Oct. 2023, 11 pages.
Fan, Fanda , et al., "Hierarchical Masked 3D Diffusion Model for Video Outpainting", Cornell University, arXiv.org, [retrieved from the internet on Oct. 21, 2024], <https://arxiv.org/pdf/2309.02119>, Jan. 19, 2024, 13.
Ge, Songwei , et al., "Long Video Generation with Time-Agnostic VQGAN and Time-Sensitive Transformer", Cornell University, arXiv.org, [retrieved from the internet on Sep. 20, 2024], <https://arxiv.org/pdf/2204.03638>, Sep. 24, 2022, 30 pages.
Geyer, Michal , et al., "TokenFlow: Consistent Diffusion Features for Consistent Video Editing", Cornell University, arXiv Preprint, arxiv.org [retrieved Feb. 1, 2024]. Retrieved from the Internet <https://arxiv.org/pdf/2307.10373.pdf>, Jul. 19, 2023, 13 pages.
Guo, Yuwei , et al., "AnimatedIFF: Animate Your Personalized Text-To-Image Diffusion Models Without Specific Tuning", Cornell University, arXiv.org, [retrieved from the internet on Sep. 20, 2024], <https://arxiv.org/pdf/2307.04725>, Feb. 8, 2024, 13 pages.
He, Yingqing , et al., "Latent Video Diffusion Models for High-Fidelity Long Video Generation", Cornell University, arXiv.org, [retrieved from the internet on Oct. 21, 2024], <https://arxiv.org/pdf/2211.13221>, Mar. 20, 2023, 10.
He, Kaiming , et al., "Mask R-CNN", Cornell University arXiv, arXiv.org [retrieved Mar. 15, 2023]. Retrieved from the Internet <https://arxiv.org/pdf/1703.06870.pdf>., Jan. 24, 2018, 12 pages.
Ho, Jonathan , et al., "Denoising Diffusion Probabilistic Models", Cornell University arXiv, arXiv.org [retrieved Feb. 24, 2022]. Retrieved from the Internet <https://arxiv.org/pdf/2006.11239.pdf>., Dec 16, 2020, 25 Pages.
Ho, Jonathan , et al., "Imagen video: High definition video generation with diffusion models", Cornell University arXiv, arXiv.org [retrieved Aug. 9, 2023]. Retrieved from the Internet <https://arxiv.org/pdf/2210.02303.pdf>., Oct. 5, 2022, 18 Pages.
Hu, Zhihao , et al., "VideoControlNet: A Motion-Guided Video-to-Video Translation Framework by Using Diffusion Model with ControlNet", Cornell University, arXiv.org, [retrieved from the internet on Oct. 21, 2024], <https://arxiv.org/pdf/2307.14073 >, Aug. 3, 2023, 11.
Kasten, Yoni , et al., "Layered Neural Atlases for Consistent Video Editing", Cornell University arXiv, arXiv.org [retrieved Aug. 9, 2023]. Retrieved from the Internet <https://arxiv.org/pdf/2109.11418.pdf>., Sep. 23, 2021, 12 Pages.
Khachatryan, Levon , et al., "Text2Video-Zero: Text-to-Image Diffusion Models are Zero-Shot Video Generators", Cornell University, arXiv.org, [retrieved from the internet on Sep. 20, 2024], <https://arxiv.org/pdf/2303.13439>, Mar. 23, 2023, 25 pages.
Kingma, Diederik P, et al., "Auto-Encoding Variational Bayes", Cornell University arXiv, arXiv.org [retrieved Aug. 9, 2023]. Retrieved from the Internet <https://arxiv.org/pdf/1312.6114.pdf>., May 1, 2014, 14 Pages.
Kulal, Sumith , et al., "Putting People in Their Place: Affordance-Aware Human Insertion into Scenes", Cornell University, arXiv.org, [retrieved from the internet on Oct. 21, 2024], <https://arxiv.org/pdf/2304.14406>, Apr. 27, 2023, 15.
Loshchilov, Ilya , et al., "Decoupled Weight Decay Regularization", Cornell University arXiv, arXiv.org [retrieved Aug. 9, 2023]. Retrieved from the Internet <https://arxiv.org/pdf/1711.05101.pdf>., Jan. 4, 2019, 19 Pages.
Monfort, Mathew , et al., "Moments in Time Dataset: One Million Videos for Event Understanding", Cornell University arXiv, arXiv.org [retrieved Feb. 9, 2022]. Retrieved from the Internet <https://arxiv.org/pdf/1801.03150.pdf>., Feb. 16, 2019, 8 Pages.
Pont-Tuset, Jordi , et al., "The 2017 Davis Challenge on Video Object Segmentation", Cornell University arXiv, arXiv.org [retrieved Feb. 15, 2022]. Retrieved from the Internet <https://arxiv.org/pdf/1704.00675.pdf>., Mar. 1, 2018, 6 pages.
Radford, Alec , et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.
Ramesh, Aditya , et al., "Hierarchical Text-Conditional Image Generation with Clip Latents", Cornell University arXiv, arXiv.org [retrieved Aug. 11, 2023]. Retrieved from the Internet <https://arxiv.org/pdf/2204.06125.pdf>., Apr. 13, 2022, 27 Pages.
Ranftl, René , et al., "Towards Robust Monocular Depth Estimation: Mixing Datasets for Zero-shot Cross-dataset Transfer", Cornell University arXiv, arXiv.org [retrieved Nov. 15, 2022]. Retrieved from the Internet <https://arxiv.org/pdf/1907.01341.pdf>., Aug. 25, 2020, 14 Pages.
Rombach, Robin , et al., "High-Resolution Image Synthesis with Latent Diffusion Models", Cornell University arXiv, arXiv.org [retrieved Aug. 11, 2023]. Retrieved from the Internet <https://arxiv.org/pdf/2112.10752.pdf>., Apr. 13, 2022, 45 Pages.
Ronneberger, Olaf , et al., "U-Net: Convolutional Networks for Biomedical Image Segmentation", Cornell University arXiv, arXiv.org [retrieved Mar. 16, 2023]. Retrieved from the Internet <https://arxiv.org/pdf/1505.04597.pdf>., May 18, 2015, 8 pages.
Saharia, Chitwan , et al., "Palette: Image-to-Image Diffusion Models", Cornell University, arXiv.org, [retrieved from the internet on Oct. 21, 2024], <https://arxiv.org/pdf/2111.05826>, May 3, 2022, 29.
Sigurdsson, Gunnar A., et al., "Hollywood in Homes: Crowdsourcing Data Collection for Activity Understanding", Cornell Univer-

(56) References Cited

PUBLICATIONS sity, arXiv.org, [retrieved from the internet on Oct. 21, 2024], <https://arxiv.org/pdf/1604.01753>, Jul. 26, 2016, 17.
Tulyakov, Sergey , et al., "MoCoGAN: Decomposing Motion and Content for Video Generation", Dec. 14, 2017, 13 pages.
Villegas, Ruben , et al., "Phenaki: Variable Length Video Generation From Open Domain Textual Descriptions", Cornell University, arXiv.org, [retrieved from the internet on Sep. 20, 2024], <https://arxiv.org/pdf/2210.02399>, Oct. 5, 2022, 17 pages.
Vondrick, Carl , et al., "Generating Videos with Scene Dynamics", Cornell University, arXiv.org, <https://arxiv.org/pdf/1609.02612>, Oct. 26, 2016, 10 pages.
Wikipedia , "On-set virtual production", Wikipedia, wikipedia.org, [retrieved from the internet on Oct. 21, 2024], <https://en.wikipedia.org/wiki/On-set_virtual_production>, 2024, 9.
Wu, Jay Zhangjie, et al., "Tune-A-Video: One-Shot Tuning of Image Diffusion Models for Text-to-Video Generation", Cornell University, arXiv.org, arXiv:2212.11565 [cs.CV], retrieved from the internet on May 20, 2024, <https://arxiv.org/abs/2212.11565>, Mar. 17, 2023, 16 pages.
Xie, Shaoan , et al., "SmartBrush: Text and Shape Guided Object Inpainting with Diffusion Model", Cornell University, arXiv.org, [retrieved from the internet on Oct. 21, 2024], <https://arxiv.org/pdf/2212.05034>, Dec. 9, 2022, 10.
Yang, Binxin , et al., "Paint by Example: Exemplar-based Image Editing with Diffusion Models", Cornell University, arXiv.org, [retrieved from the internet on Oct. 21, 2024], <https://arxiv.org/pdf/2211.13227>, Nov. 23, 2022, 15.
Yu, Lijun , et al., "MAGVIT: Masked Generative Video Transformer", Cornell University, arXiv.org, [retrieved from the internet on Oct. 21, 2024], <https://arxiv.org/pdf/2212.05199>, Apr. 5, 2023, 30.
Yu, Sihyun , et al., "Video Probabilistic Diffusion Models in Projected Latent Space", Cornell University, arXiv.org, [retrieved from the internet on Oct. 21, 2024], <https://arxiv.org/pdf/2302.07685>, Mar. 30, 2023, 15.
Zhang, Lvmin , et al., "Adding Conditional Control to Text-to-Image Diffusion Models", Cornell University, arXiv Preprint, arxiv.org [retrieved Nov. 10, 2023]. Retrieved from the internet <https://arxiv.org/pdf/2302.05543.pdf>, Feb. 10, 2023, 12 pages.
Zhou, Shangchen , et al., "ProPainter: Improving Propagation and Transformer for Video Inpainting", Cornell University, arXiv.org, [retrieved from the internet on Oct. 14, 2024], <https://arxiv.org/pdf/2309.03897>, Sep. 7, 2023, 17.

* cited by examiner

SUBJECT-AWARE VIDEO BACKGROUND GENERATION

BACKGROUND

Video compositing is the process of combining features from multiple digital content items to create a composite video. For example, video compositing is often used to change the background of a video. However, conventional techniques face several technical challenges that limit their applicability to particular scenarios. These techniques typically involve numerous manual interactions, which results in increased computational resource consumption, reduced user efficiency, and limited flexibility in iterating different background ideas.

SUMMARY

Techniques and systems for subject-aware video background generation are described. In one example, a processing device receives an input video that depicts a subject in an environment. A condition frame or image showing a different environment is also received. The processing device uses the input video to generate mask data and subject data to isolate the subject from the environment in the input video and describe subject features, respectively. A machine-learning model uses the mask data, subject data, and condition frame to generate a composite video that aligns the subject's movement with the environment depicted in the condition frame. The processing device then presents the composite video via a user interface.

This Summary introduces a simplified selection of concepts that are further described below in the Detailed Description. As such, this Summary is not intended to identify essential features of the claimed subject matter or to aid in determining its scope.

BRIEF DESCRIPTION OF THE DRAWINGS

The detailed description is described with reference to the accompanying figures. Entities represented in the figures are indicative of one or more entities, and thus, reference is made interchangeably to single or plural forms of the entities in the discussion.

DETAILED DESCRIPTION

Overview

Figure 1:
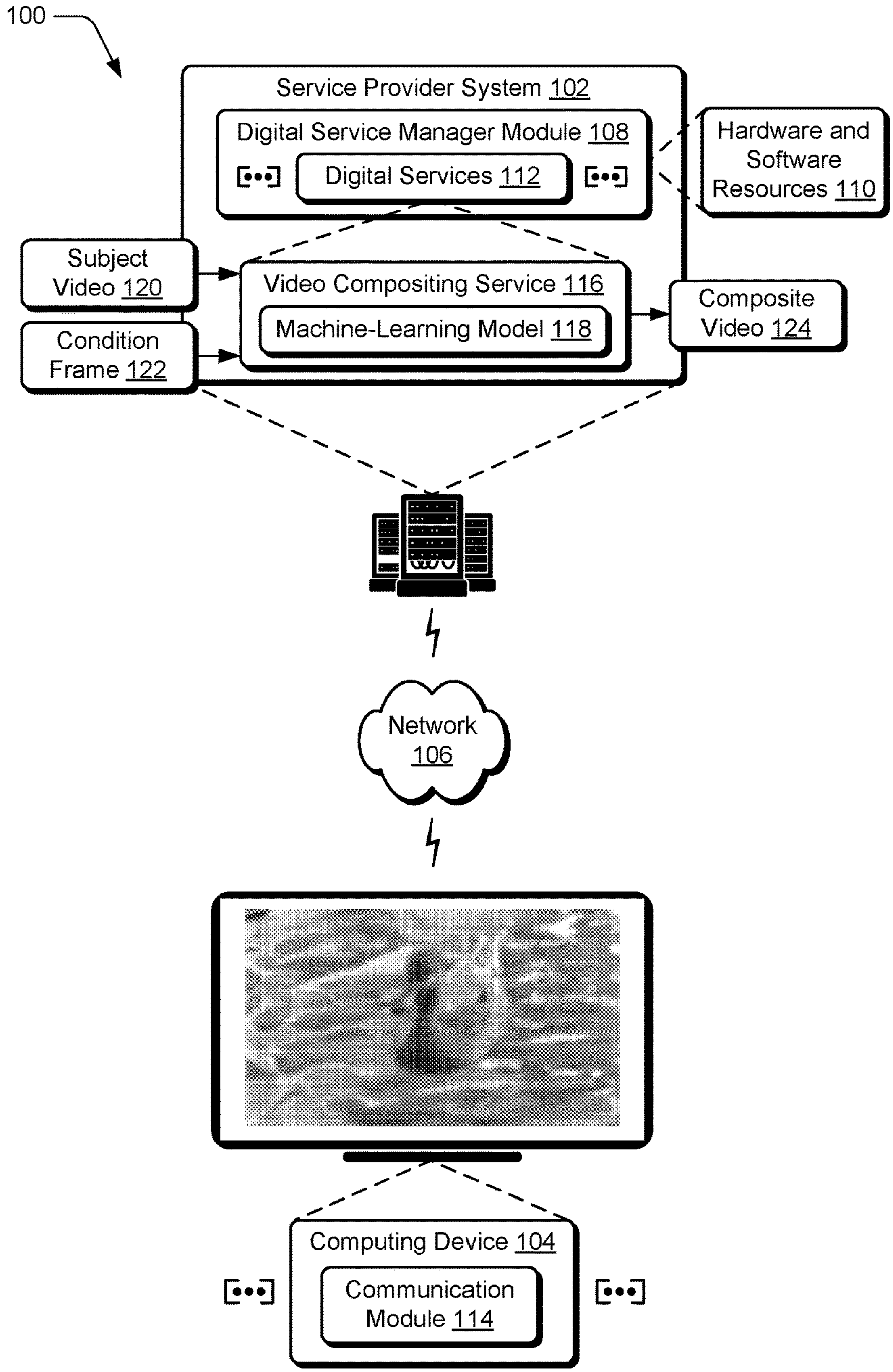
FIG. 1 illustrates a digital medium environment in an example implementation that is operable to employ subject-aware video background generation techniques as described herein.

This document introduces video compositing systems and techniques that provide automatic subject-aware video background generation, which previously involved tedious manual efforts. A video-based generative model automates synthesizing a background from a condition frame and aligns the background with the motion and appearance of a foreground subject in an input video. The generative model is trained on a large set of training videos with subject-scene interactions to generate foreground-background interactions in composite videos. The condition frame is used to constrain or condition the generative model to maintain the desired background. In particular, background feature data from the condition frame is inserted through the cross-attention layers of the model's denoising network to focus the background synthesis on environmental details in the condition frame. This results in a coherent video with realistic foreground-background interactions that can be quickly and easily iterated to meet an artist's creative vision, while reducing computational resource consumption and video editing time.

Generating video backgrounds tailored to a foreground subject's motion is employed by both the movie industry and visual effects community. One approach is to use video compositing, which combines features from multiple videos or images to form a composite video. A subject video, for instance, may include a subject, and an environment video is usable to define an environment in which the subject is to be disposed of as part of a composite video. Video composition, however, poses a significant challenge in correctly inferring and extrapolating subject-scene interactions into an extended space-time volume given these two input signals. Conventional techniques to perform video compositing, however, encounter numerous technical challenges that limit applicability to particular scenarios.

Conventional techniques struggle to generate a background in the composite video that aligns with the motion and appearance of the foreground subject from the input video, while also complying with a creator's original intention. In addition, conventional techniques struggle to seamlessly integrate the foreground subject with the background in terms of camera motions, interactions, lighting, and shadows so that the composition looks realistic.

Some conventional techniques address these technical challenges by including manual harmonization and synchronization as part of capturing the subject video and capturing the environment video to have corresponding movement, lighting, and appearance, as well as hallucinating the interaction. Manual synchronization is prone to error, results in visual artifacts, and increases computational resource consumption as part of a back-and-forth process. Other conventional techniques rely on video editing. However, such edited videos tend to keep the spatial structure from the source video, greatly limiting the edits a model can perform.

In addition, such approaches are tedious, expensive, and, most importantly, difficult, if not impossible, to quickly iterate.

Accordingly, video compositing techniques are described herein as implemented by a video compositing service that leverages subject awareness from an input video to address these and other technical challenges in generating alternative video backgrounds. A subject video, for instance, is usable to capture a subject of a composite video. A condition frame, on the other hand, is used as a basis to capture or generate an environment for the composite video. The condition frame can be either a background-only image or a composite frame consisting of the background and subject. The condition frame can be a photograph, a manually created image using photo editing tools, or an automated image generated using artificial intelligence tools.

The video compositing service uses a machine-learning model (e.g., a diffusion-based model) that leverages cross-frame attention for temporal reasoning. The video compositing service utilizes the power of large-scale video diffusion models to generate a composite video with realistic foreground-background interactions within an extended space-time volume that adheres to the condition frame. As part of generating the composite video, the movement of a viewpoint of the subject is aligned with movement within an environment rendered based on the condition frame. The video compositing service, for instance, follows the movement of the subject as defined in the subject video and generates a video background using a three-dimensional representation of the environment defined in the condition frame.

Generation of the video background may include "new" views of the environment that are not included in the condition frame but rather are generated using machine learning, e.g., generative artificial intelligence. In addition, the composite video includes highly realistic details, such as splashing water, moving smoke, etc., to complement the foreground-background interaction. In other words, the model provides a strong generalization capability that allows for the realistic and creative integration of different subjects (e.g., from various subject videos) into various background scenes by using a video diffusion-based model that is trained in a self-supervised manner on a large-scale human-scene interaction video dataset and injecting the condition frame through cross-attention layers of the denoising U-Net. Further discussion and examples can be found in the following figures and corresponding descriptions.

The following discussion describes an example environment that employs the techniques described herein. Example procedures are also described as performable in the example environment and other environments. Consequently, the performance of the example procedures is not limited to the example environment, and the example environment is not limited to the performance of the example procedures.

Example Video Compositing Environment

FIG. 1 is an illustration of a digital medium environment 100 in an example implementation that is operable to employ subject-aware video background generation techniques as described herein. The illustrated digital medium environment 100 includes a service provider system 102 and a computing device 104 that are communicatively coupled, one to another, via a network 106. Computing systems for the service provider system 102 and the computing device 104 are configurable in various ways. For instance, computing device 104 is associated with a user, and service provider system 102 is a remote computing system (e.g., one or more servers) configured to employ the described techniques and systems for subject-aware video background generation.

A computing system, for instance, is configurable as a desktop computer, laptop computer, mobile device (e.g., assuming a handheld configuration such as a tablet or mobile phone), server, and so forth. Thus, the service provider system 102 or the computing device 104 is capable of ranging from a full-resource device with substantial memory and processor resources (e.g., servers and personal computers) to a low-resource device with limited memory and/or processing resources (e.g., some mobile devices). Additionally, although a single computing device is shown for the computing device 104 and described in instances in the following discussion, a computing system is also representative of a plurality of different devices, such as multiple servers utilized by a business to perform operations "over the cloud" for the service provider system 102 and as further described in relation to FIG. 9.

The service provider system 102 includes a digital service manager module 108 implemented using hardware and software resources 110 (e.g., a processing device and computer-readable storage medium) to support one or more digital services 112. Digital services 112 are made available remotely via the network 106 to computing devices (e.g., computing device 104).

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the digital services 112 via the network 106. A result of processing using the digital services 112 is then returned to the computing device 104 via the network 106.

In the illustrated digital medium environment 100, the digital services 112 include a video compositing service 116 for generating videos with different backgrounds. For example, the video compositing service 116 uses machine-learning model 118 to process a subject video 120 and a condition frame 122 to generate a composite video 124. Given a subject video 120 "X" capturing a foreground subject with a free-moving camera and a condition frame 122 "c" depicting a different background or environment, the video compositing service 116 generates the composite video 124. The composite video 124 depicts the foreground subject with an alternative video background based on the environment from condition frame 122. Visually, the video compositing service 116 swaps an original background in the subject video 120 with a different video background realistically and plausibly.

As previously described, conventional video compositing techniques involve recording or generating environment videos to superimpose the subject. In the techniques described herein, however, compositing is performed independent of background videos, and no prior constraint is placed on the motion of a viewpoint (i.e., the camera motion) capturing the subject video 120.

Diffusion models have also gained popularity for editing digital videos using text prompts. Although success has been exhibited in these scenarios, these conventional techniques often fail when confronted with video editing tasks focused exclusively on using text to describe the edits. In particular, these conventional techniques fail in scenarios in which the nature of the alternative background cannot be accurately expressed using text alone. Further, conventional techniques lack interaction awareness to adapt the generated environment to the subject and the subject's movement.

In contrast, the described video compositing service 116 is configurable to address these and other technical challenges. The video compositing service 116 generates a large background region built out from the condition frame 122. The generated background in the composite video 124 adapts to the subject's motion in the subject video 120 as the subject and camera viewpoint move within the generated background region. In other words, the video compositing service 116 synchronizes the motion of viewpoints between the subject in the subject video 120 with the background region generated from the condition frame 122.

To do so, the video compositing service 116 is configurable to employ a diffusion model that processes the subject video 120 and the condition frame 122. The results are temporally coherent videos that follow the foreground motion with highly realistic details within an extended space-time volume that adheres to the environmental guidance provided in condition frame 122. In one or more examples, the diffusion model does so after being trained according to subject-aware background video generating, as further described in relation to FIG. 6. Further discussion of these and other examples is included in the following section and shown in the corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Subject-Aware Video Background Generation

Figure 2:
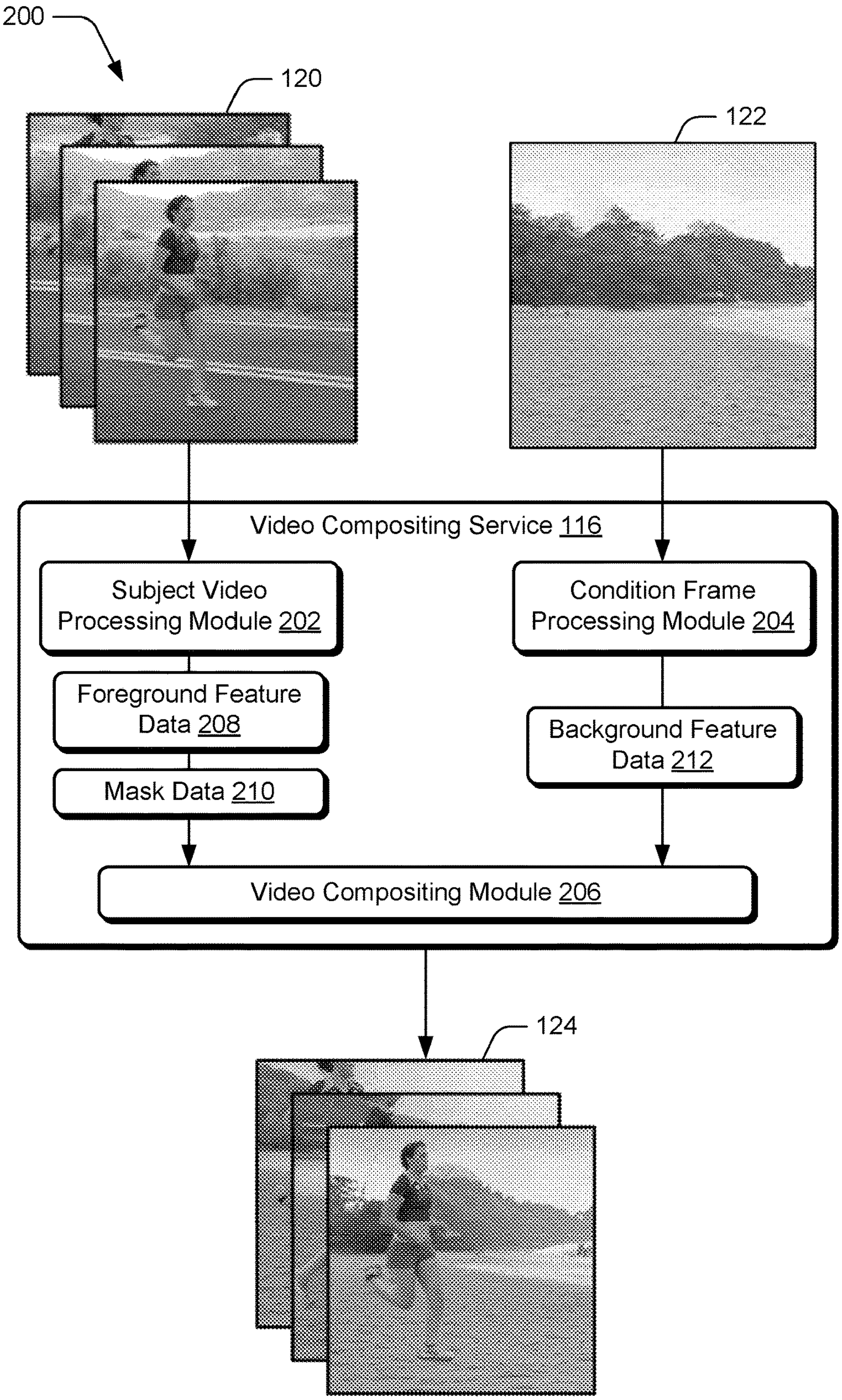
FIG. 2 depicts a system in an example implementation showing operation of a video compositing service of FIG. 1 in greater detail as employing the techniques described herein.

FIG. 2 depicts a system 200 in an example implementation showing the operation of the video compositing service 116 of FIG. 1 as employing the techniques described herein. The video compositing service 116 is configurable to implement a pipeline to address technical challenges supporting generation of a video background that tailors to the motion of a foreground subject in video compositing. To do so, the video compositing service 116 employs a subject video processing module 202, a condition frame processing module 204, and a video compositing module 206.

The subject video processing module 202 is configured to process the subject video 120 to form foreground feature data 208 and mask data 210. The condition frame processing module 204 is configured to process the condition frame 122 to generate background feature data 212. Outputs of the subject video processing module 202 and the condition frame processing module 204 are then received as inputs by the video compositing module 206 to generate the composite video 124.

The subject video processing module 202, for instance, is configured to segment a subject from the subject video 120 to form the foreground feature data 208, which includes a subject segmentation sequence. The subject video processing module 202 is configured to generate mask data 210, e.g., as one or more masks. Generation of the foreground feature data 208 and the mask data 210 is further described in relation to FIG. 3. The condition frame processing module 204 is configured to generate background feature data 212 as a latent-space representation of an environment depicted in the condition frame 122, as further described in relation to FIG. 4.

The video compositing module 206 is then employed to render the subject based on the mask data 210 within the environment depicted in condition frame 122 based on background feature data 212 in relation to foreground feature data 208. The video compositing module 206 is also configured to employ appearance and background harmonization. Compared with conventional techniques, the video compositing service 116 exhibits improved performance and supports synthesizing novel views and backgrounds even in scenarios involving large changes in viewpoints, e.g., camera motions.

Figure 3:
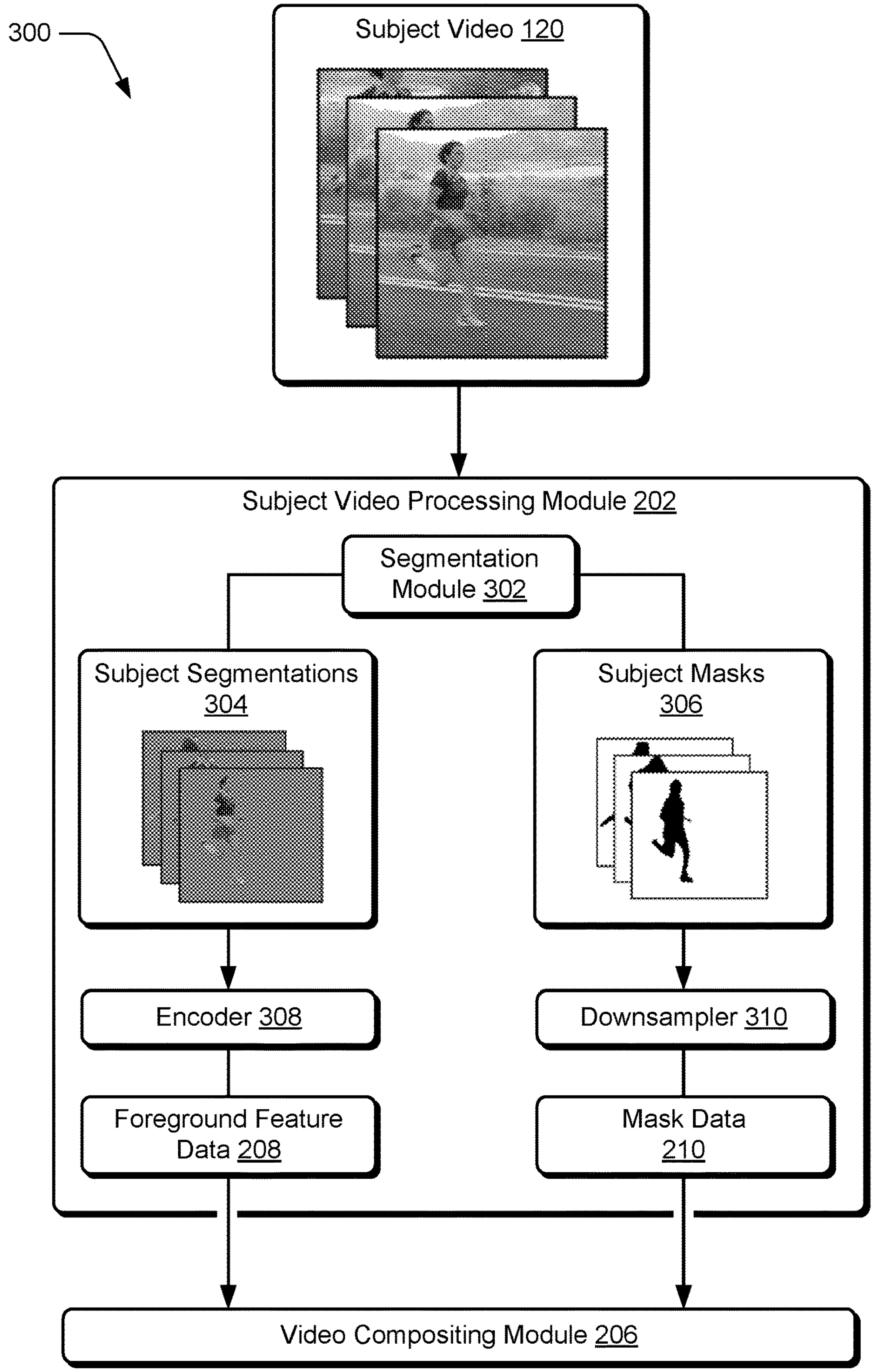
FIG. 3 depicts a system in an example implementation showing operation of a subject video processing module of the video compositing service of FIG. 2 in greater detail.

FIG. 3 depicts a system 300 in an example implementation showing an operation of the subject video processing module 202 of the video compositing service 116 of FIG. 2 in greater detail. The subject video processing module 202 includes a segmentation module 302 that is configured to perform semantic segmentation and object detection, which in combination may be referred to as "instance segmentation." In particular, the segmentation module 302 generates subject segmentations 304 and subject masks 306 in segmenting a subject from the subject video 120. Various techniques can perform instance segmentation, represented by the segmentation module 302.

Instance segmentation involves correctly detecting one or all objects (e.g., a foreground subject) in a video frame while also segmenting each instance across video frames. Object detection attempts to classify individual objects and localize each using a bounding box, while semantic segmentation classifies each pixel into a fixed set of categories without differentiating object instances. Instance segmentation algorithms use machine-learning models, including convolutional neural networks (CNN), to detect objects in an image while simultaneously generating a segmentation mask for each instance. For example, the segmentation module 302 may utilize a Mask region-based CNN (R-CNN) algorithm to predict subject masks 306 parallel to a branch for identifying subject segmentations 304. Further discussion of instance segmentation techniques may be found at Kaiming He et al., "Mask R-CNN," in *ICCV*, March 2017, the disclosure of which is hereby incorporated by reference.

The subject video 120 "$\mathcal{X}$," for instance, is definable as:

$$\mathcal{X} \in \mathbb{R}^{T\times H\times W\times 3},$$

where T represents the number of frames, H represents the height of each frame (e.g., in pixels), W represents the width of each frame (e.g., in pixels), and the last value represents the number of channels in each frame (e.g., red (R), green (G), blue (B) color channels). The subject video 120 features a foreground subject, which is illustrated as a runner in FIG. 3.

The subject segmentations 304 "$\mathcal{S}$" or subject segmentation sequence and the subject masks 306 "$\mathcal{M}$", for instance, are definable as, respectively:

$$\mathcal{S} \in \mathbb{R}^{T \times H \times W \times 3}$$

and $$\mathcal{M} \in \mathbb{R}^{T \times H \times W \times 1}.$$

In one implementation, the subject segmentations 304 "$\mathcal{S}$" includes the segmentation of the foreground subject, with background pixels set to grey (e.g., 127). The segmentation module 302 sets the foreground pixels of the subject masks 306 "$\mathcal{M}$" to black (e.g., 0) and background pixels to white (e.g., 1). In this example, H=W=256 pixels and T=16 frames.

The subject video processing module 202 also includes an encoder 308 and a downsampler 310. The encoder 308 is configured to compress the subject segmentations 304. In the illustrated implementation, the encoder 308 uses a variational autoencoder (VAE) "ε" to compress an input image x from a pixel space into latent representations (e.g., z=ε(x)) in a latent space. In video processing, the latent space includes classification codes representing the key features learned from many images to maintain detailed data while reducing data complexity.

The encoder 308 uses the pre-trained, machine-learning VAE "ε" to encode the subject segmentations 304 "$\mathcal{S}$" into latent features "$\hat{\mathcal{S}}$" as the foreground feature data 208 in four latent channels, which are definable as:

$$\hat{\mathcal{S}} \in \mathbb{R}^{16 \times 32 \times 32 \times 4}.$$

The downsampler 310 downsamples the subject masks 306 "$\mathcal{M}$" to match the size of the foreground feature data 208. In the illustrated implementation, the downsampler 310 downsamples the subject masks 306 "$\mathcal{M}$" eight times to obtain the resized mask sequence $\hat{\mathcal{M}} \in \mathbb{R}^{16 \times 32 \times 32 \times 1}$ to align with the latent features "$\hat{\mathcal{S}}$". The segmentation module 302 then outputs the foreground feature data 208 (e.g., the latent features "$\hat{\mathcal{S}}$") and the mask data 210 (e.g., resized mask data "$\hat{\mathcal{M}}$") to the video compositing module 206.

Figure 4:
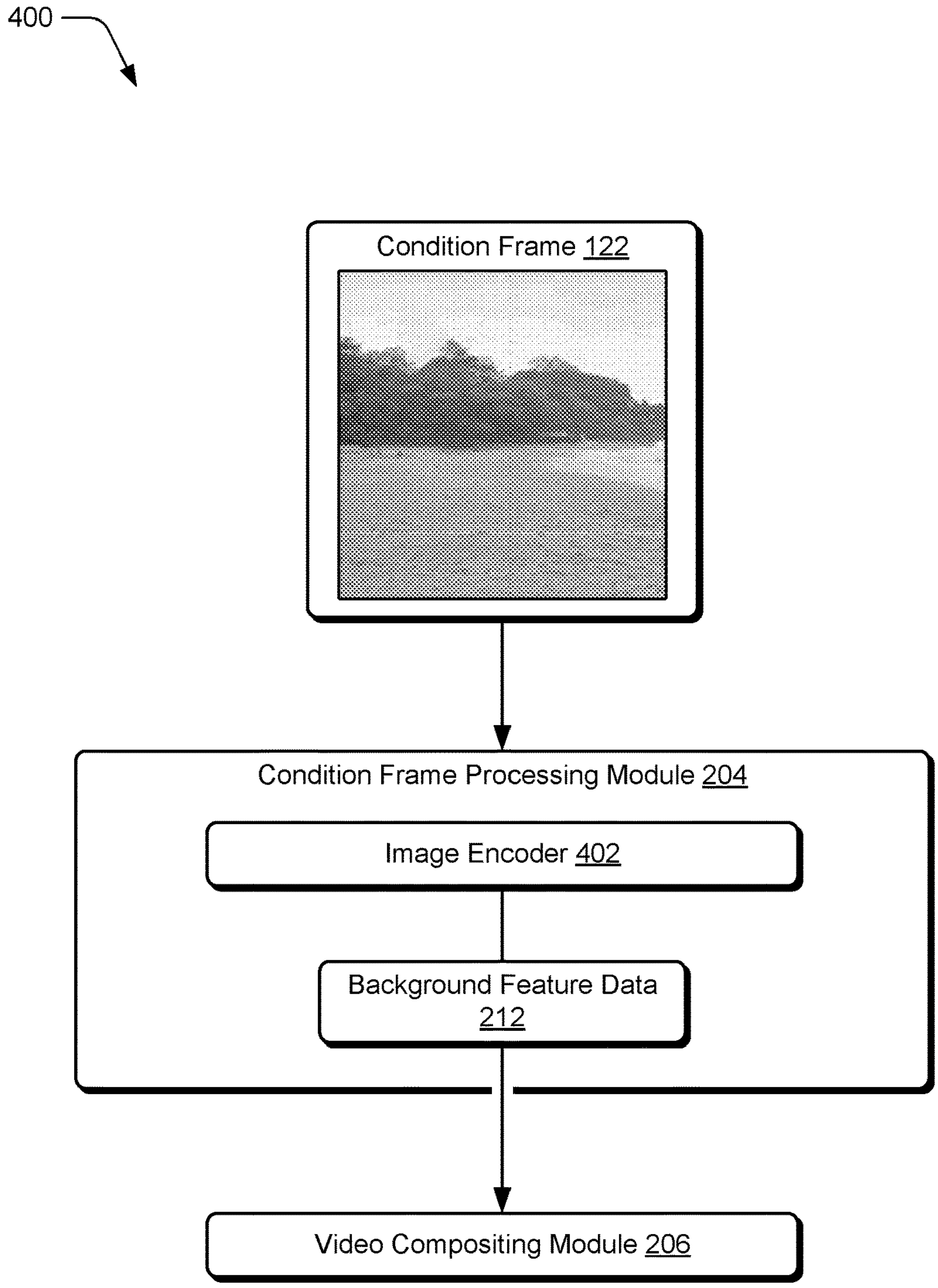
FIG. 4 depicts a system in an example implementation showing operation of a condition frame processing module of the video compositing service of FIG. 2 in greater detail.

FIG. 4 depicts a system 400 in an example implementation showing the operation of the condition frame processing module 204 of the video compositing service 116 of FIG. 2 in greater detail. The condition frame processing module 204 includes an image encoder 402 configured to generate background feature data 212 from the condition frame 122.

As described above, the condition frame 122 includes an image of a different background or environment for the composite video with or without the subject. Condition frames 122 include photographs or video frames of a different environment than those in the subject video 120. In other implementations, users generate the condition frame 122 using an image creation service.

Some traditional approaches, such as using machine learning to convert text to video, utilize language as the input to generate a different background in a composite video. However, such methods often need precise and specific prompt engineering to create an environment with the desired intricacy and features. On the other hand, using a condition frame or image as described in this document is a more straightforward way to convey detailed and specific information about the intended background, particularly if users already have a predefined target scene in mind.

The image encoder 402, using a machine-learning model, encodes the condition frame 122 and passes the image features from the last hidden layer or penultimate layer (e.g., ignoring any classification layer) as the background feature data 212. As described in greater detail with respect to FIG. 5, the background feature data 212 are then injected into a machine-learning model of the video compositing module 206.

Various techniques can perform image encoding, represented by the image encoder 402. In the described image encoder 402, image encoding involves computing a feature representation for the condition frame 122. For example, the image encoder 402 may utilize a machine-learning Contrastive Language-Image Pre-training (CLIP) image encoder to generate encoding "$F^c$" (e.g., the background feature data 212) from the condition frame 122 "c," resulting in data with a size comparable to the size of text inputs for other machine-learning models. Further discussion of such image encoding techniques may be found at Alec Radford et al., "Learning Transferable Visual Models from Natural Language Supervision," in *ICML*, February 2021, the disclosure of which is hereby incorporated by reference.

Figure 5:
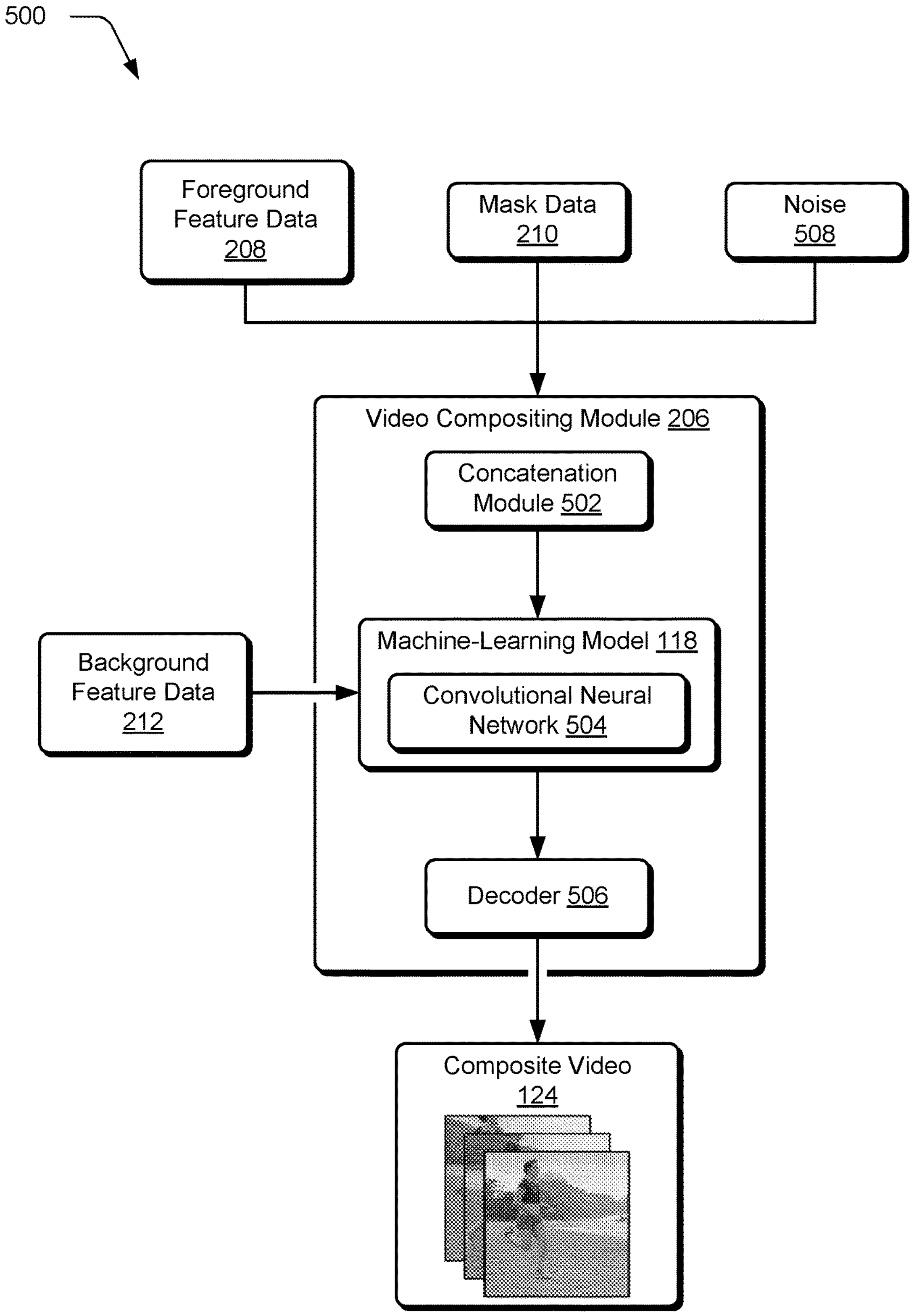
FIG. 5 depicts a system in an example implementation showing operation of a video compositing module of the video compositing service of FIG. 2 in greater detail.

FIG. 5 depicts a system 500 in an example implementation showing the operation of the video compositing module 206 of the video compositing service 116 of FIG. 2 in greater detail. The video compositing module 206 includes a concatenation module 502, the machine-learning model 118 with a convolutional neural network 504, and a decoder 506.

The video compositing module 206 receives as inputs the foreground feature data 208, mask data 210, and noise 508, which are provided to the concatenation module 502. The noise 508 "$Z_0$" is initialized as Gaussian noises, which is auto-regressively denoised for multiple time steps in the convolutional neural network 504 to generate or sample a final result, as described in greater detail below. The video compositing module 206 also receives, as inputs, the background feature data 212, which is provided to the convolutional neural network 504.

The concatenation module 502 concatenates the foreground feature data 208, the mask data 210, and the noise 508 together. In particular, the latent features $\hat{\mathcal{S}}$ of the foreground feature data 208, the resized mask data $\hat{\mathcal{M}}$ of the mask data 210, and Gaussian noises $Z_0$ (e.g., noisy latent features in the four latent channels) of the noise 508 are concatenated along the feature dimension to form an input feature to the convolutional neural network 504. Continuing the previous example, the concatenation module 502 forms a nine-channel input feature $$F_T^i \in \mathbb{R}^{16 \times 32 \times 32 \times 9}.$$

The machine-learning model 118 utilizes the convolutional neural network 504 to perform background generation and video compositing based on latent video diffusion models. The convolutional neural network 504 uses the foreground feature data 208 to enable proper motion guidance, while the background feature data 212 is injected to make the generated video background adhere to the condition frame 122. In one implementation, the convolutional neural network 504 uses a diffusion model, such as a denoising diffusion probabilistic model (DDPM), with a forward process to add noise and a backward process to denoise. For a diffusion time step $\tau$, the convolutional neural network 504 incrementally introduces Gaussian noises (e.g., noise 508) into the data distribution $x_0 \sim q(x_0)$ via a Markov chain forward process, following a predefined variance schedule denoted as $\beta$:

$$q(x_\tau \mid x_{\tau-1}) = \mathcal{N}\left(x_\tau; \sqrt{1-\beta_\tau}\, x_{\tau-1}, \beta_\tau \mathcal{J}\right)$$

For the backward process, the machine-learning model 118 trains a U-Net "$\epsilon_\theta$" to denoise $x_\tau$ and recover the original data distribution:

$$p_\theta(x_{\tau-1} \mid x_\tau) = \mathcal{N}\left(x_{\tau-1}; \mu_\theta(x_\tau, \tau), \sum\nolimits_\theta (x_\tau, \tau)\right)$$

where $\mu_\theta$ and $\Sigma_\theta$ are parametrized by the U-Net $\epsilon_\theta$. The discrepancy between the predicted noise and the ground-truth noise is minimized as the training objective.

The convolutional neural network 504 is trained and operates the diffusion model in the latent space of the VAE in encoder 308. Specifically, the encoder 308 $\varepsilon$ learns to compress an input image x into latent representations $z=\varepsilon(x)$, and the decoder 506 "$\mathcal{D}$" learns to reconstruct the latent features back to pixel space, such that $x=\mathcal{D}(\varepsilon(x))$. In this way, the convolutional neural network 504 performs diffusion in the latent space of the encoder 308.

The three-dimensional (3D) denoising U-Net of the convolutional neural network 504 inserts a series of motion modules between the spatial attention layers in the denoising U-Net of a pre-trained text-to-image diffusion model. The motion modules include a few feature projection layers followed by one-dimensional (1D) temporal self-attention blocks. The background feature data 212 are injected into the U-Net through the attention layers.

The background feature data 212 constrains or conditions the background synthesis process of the convolution neural network 504 to generate a background consistent with the condition frame 122. In other words, the background feature data 212 acts as a control signal to guide the background synthesis with similar styles and elements as depicted in the condition frame 122. By injecting the background feature data 212 through the cross-attention layers of the denoising network, the convolutional neural network 504 focuses on the spatial features of the condition frame 122 to generate the background for the composite video 124.

In one implementation, a score or weight is generated for each feature element in the background feature data 212 that represents the feature's importance for background synthesis. Then these scores or weights are used to create a contextual representation that indicates the most relevant aspects of the condition frame 122 and incorporated into the generation process to influence the convolution neural network's decisions as it builds the composite video 124. These attention mechanisms also allow the convolutional neural network 504 to capture dependencies among background features and dynamically change the attention weights during the generation process to focus on different aspects of the condition frame 122 as needed while creating the composite video 124.

Lastly, incorporating the background feature data 212 into the attention layers enables the convolutional neural network to ensure coherence and consistency between this data and the foreground feature data 208 throughout the composite video 124. In these ways, the video compositing module 206 outputs a composite video 124 with the subject from the subject video 120 dynamically interacting with a synthesized background based on the condition frame 122.

Figure 6:
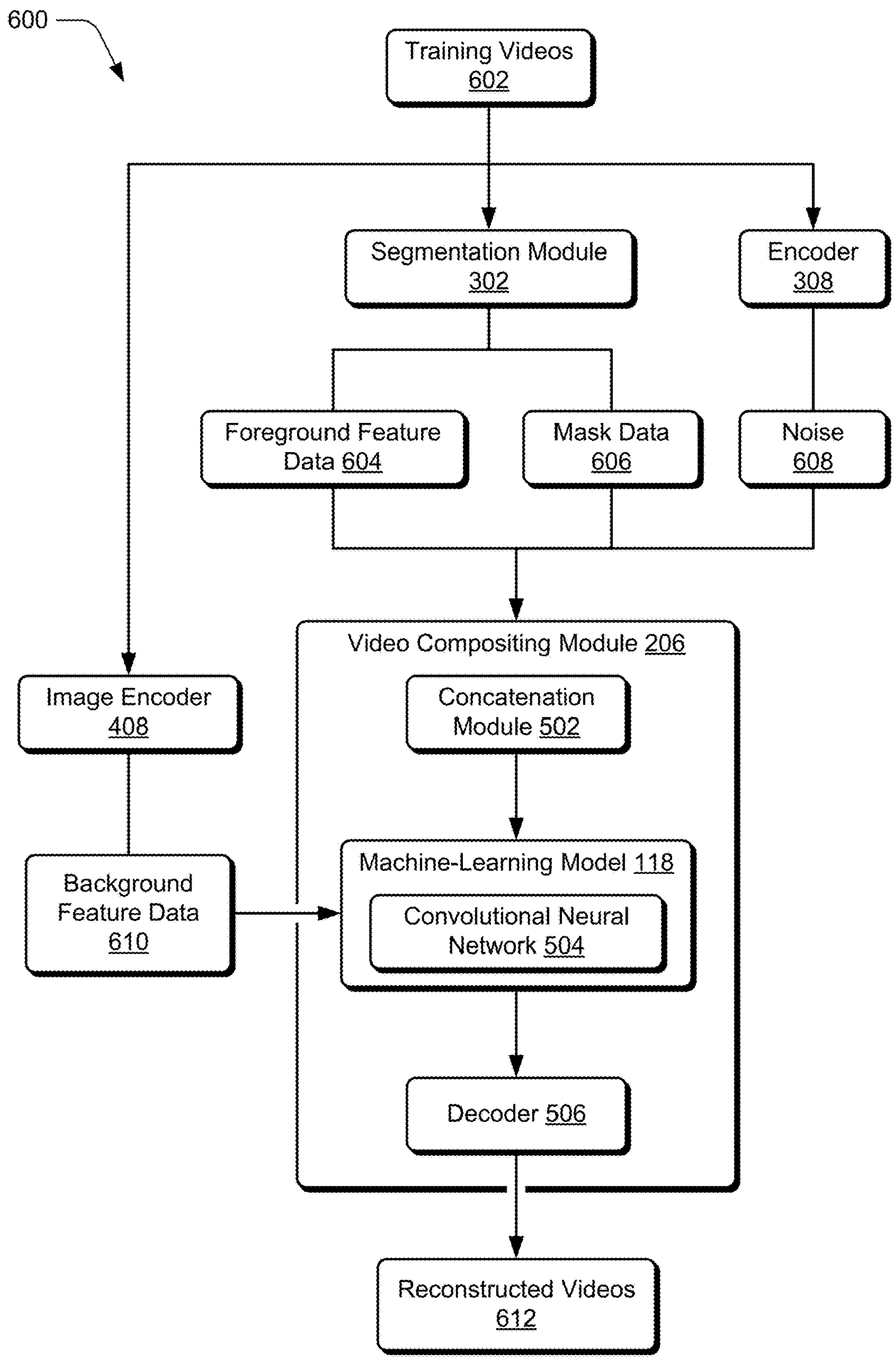
FIG. 6 depicts a system and procedure in an example implementation for training a machine-learning model.

FIG. 6 depicts a system and procedure in an example implementation 600 for training the convolutional neural network 504 as part of the machine-learning model 118 of FIG. 1. The machine-learning model 118 is representative of functionality to generate training data, use the generated training data to train the convolutional neural network 504, and/or use the trained convolutional neural network 504 as implementing the functionality described herein.

A machine-learning model refers to a tunable computer representation (e.g., through training and retraining) based on inputs without being actively programmed by a user to approximate unknown functions, automatically and without user intervention. In particular, the term machine-learning model includes a model that utilizes algorithms to learn from and make predictions on known data by analyzing training data to learn and relearn to generate outputs (e.g., composite video 124) that reflect patterns and attributes of the training data. Examples of machine-learning models include neural networks, convolutional neural networks (CNNs), long short-term memory (LSTM) neural networks, generative adversarial networks (GANs), deep learning neural networks, and so forth.

In one implementation, the convolutional neural network 504 employs a diffusion model. A "diffusion model" is a generative machine-learning model for digital content creation (e.g., composite videos 124). To train the diffusion model, noise is added to training data samples until the data within the training data samples is obscured. The diffusion model is then trained self-supervised to reverse this process based on training data with a text prompt describing the digital content to be created to generate data samples as the digital content corresponding to the text prompt.

In order to train the diffusion model, training videos 602 are received that provides examples of "what is to be learned" by the convolutional neural network 504, i.e., as a basis to learn patterns from the data. The training videos 602 include many videos (e.g., 2.4 million) of human-scene or subject-scene interactions. The training videos 602 are input to the segmentation module 302, the encoder 308, and the image encoder 408, which process the training videos 602 as described above with respect to FIGS. 3 and 4, respectively. In particular, the encoder 308 of the segmentation module 302 uses the pre-trained VAE "$\varepsilon$" to generate foreground feature data 604 (e.g., the latent features "$\hat{\mathcal{S}}$") from the training videos 602. The segmentation module 302 also uses the training videos 602 to generate mask data 606 (e.g., resized mask data "$\hat{\mathcal{M}}$").

To train the denoising network or U-Net $\epsilon_\theta$, the encoder 308 encodes the original frames $\mathcal{X}$ of the training videos 602 into a latent representation $Z \in \mathbb{R}^{16\times32\times32\times4}$. The encoder 308 also adds noises at diffusion time step $\tau$ with the above-described forward diffusion processed to get noise 608 as latent features $Z_\tau$. The concatenation module 502 then concatenates the foreground feature data 604, the mask data 606, and the noise 608 along the feature dimension to form a nine-channel input feature $$F_\tau^i$$

to the convolutional neural network 504. The image encoder 408 encodes a randomly selected frame from the input training video 602, which is chosen as the condition frame for training, to generate background feature data 610 $F^c$.

Model training of the convolutional neural network 504 is supervised by a simplified diffusion objective to predict the added noise:

$$\mathcal{L} = \left\| \epsilon - \epsilon_\theta\left(F_\tau^i, \tau, F^c\right) \right\|_2^2$$

where $\in$ is the ground-truth noise added. The training output from the convolutional neural network 504 is input to the decoder 506, which outputs reconstructed videos 612. As the machine-learning model 118 is trained, the reconstructed videos 612 better reproduce or match the training videos 602.

Obtaining perfect segmentation masks from some videos is challenging. For example, the masks may be incomplete, missing some parts of the foreground or subject, or include leaked backgrounds near the boundaries. To address such imperfect segmentation, the machine-learning model 118 applies random rectangular cut-outs to the foreground segmentation and mask in some training implementations. In addition, the machine-learning model 118 performs image erosion to the segmentation and masks with a uniform kernel (e.g., 5×5 size) during training and/or inference to reduce information leak from excessive segmentation.

Figure 7:
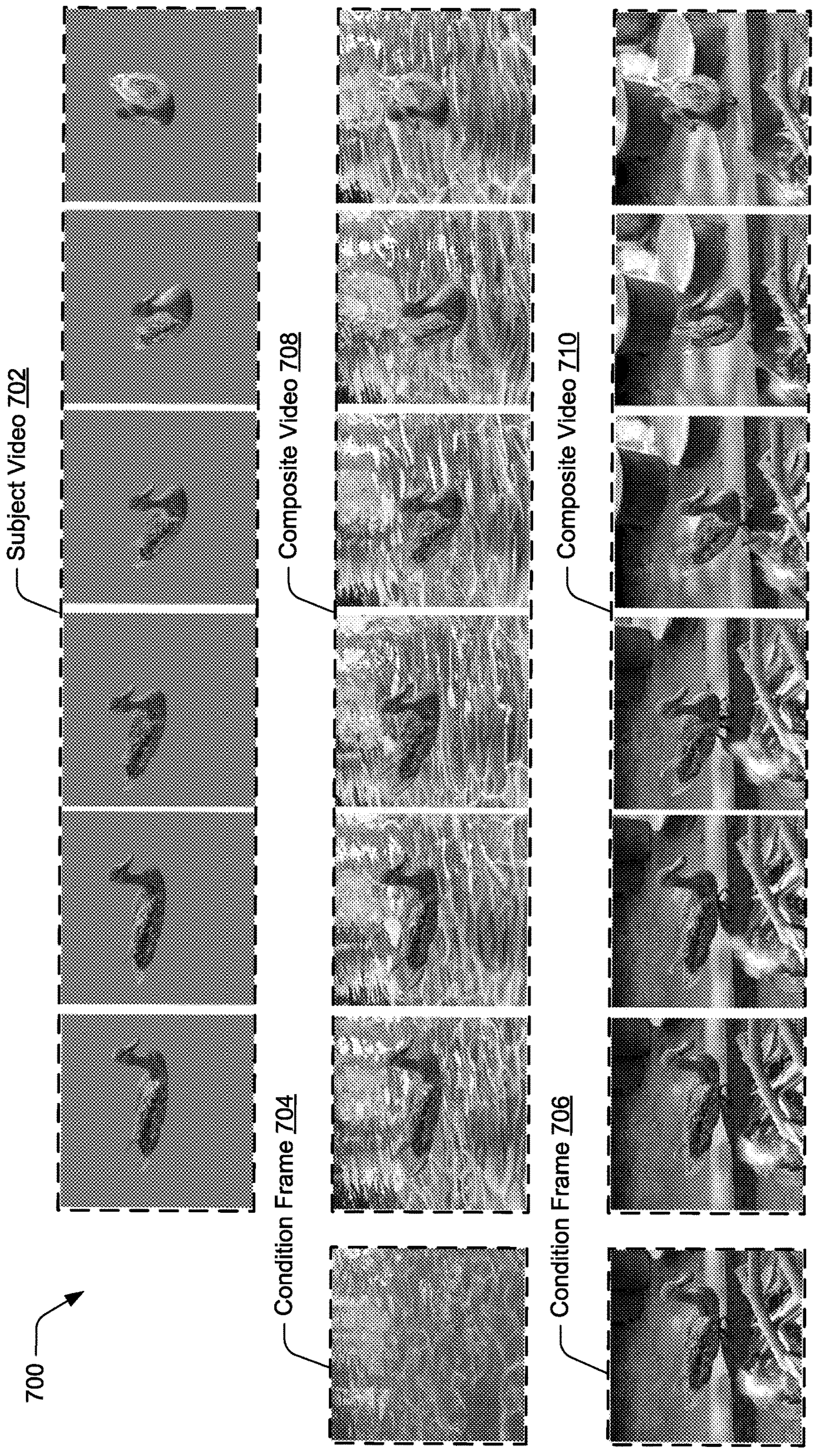
FIG. 7 depicts an example implementation showing sequences of frames corresponding to a subject video, two condition frames, and two composite videos.

FIG. 7 depicts an example implementation 700 showing sequences of frames corresponding to a subject video 702, two condition frames 704 and 706, and two composite videos 708 and 710. The subject video 702 captures the movement of a duck in a pond, which is illustrated with the original environment or background greyed out. Condition frame 704 is an image of a swimming pool without the subject (e.g., the duck). Condition frame 706 is an image of a campfire with a duck near the campfire.

As shown, the duck's movement from the subject video 702 is replicated and adapted for the alternative backgrounds in the composite videos 708 and 710. In other words, the condition frames 704 and 706 act as a basis to define the environment for the composite videos 708 and 710. In addition, the generated environments interact with the subject. For example, the water ripples from frame to frame in the composite video 708 as the duck swims around in the swimming pool. Similarly, smoke billows and wisps around the duck as it walks near the campfire in the composite video 710. In this way, the video compositing service 116 synthesizes backgrounds (e.g., from the condition frames 704 and 706) that align with the motion and appearance of the foreground subject (e.g., from the subject video 702).

Example Video Compositing Procedures

The following discussion describes video compositing techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm, e.g., responsive to execution of the instructions. In portions of the following discussion, reference will be made to FIGS. 1-7.

Figure 8:
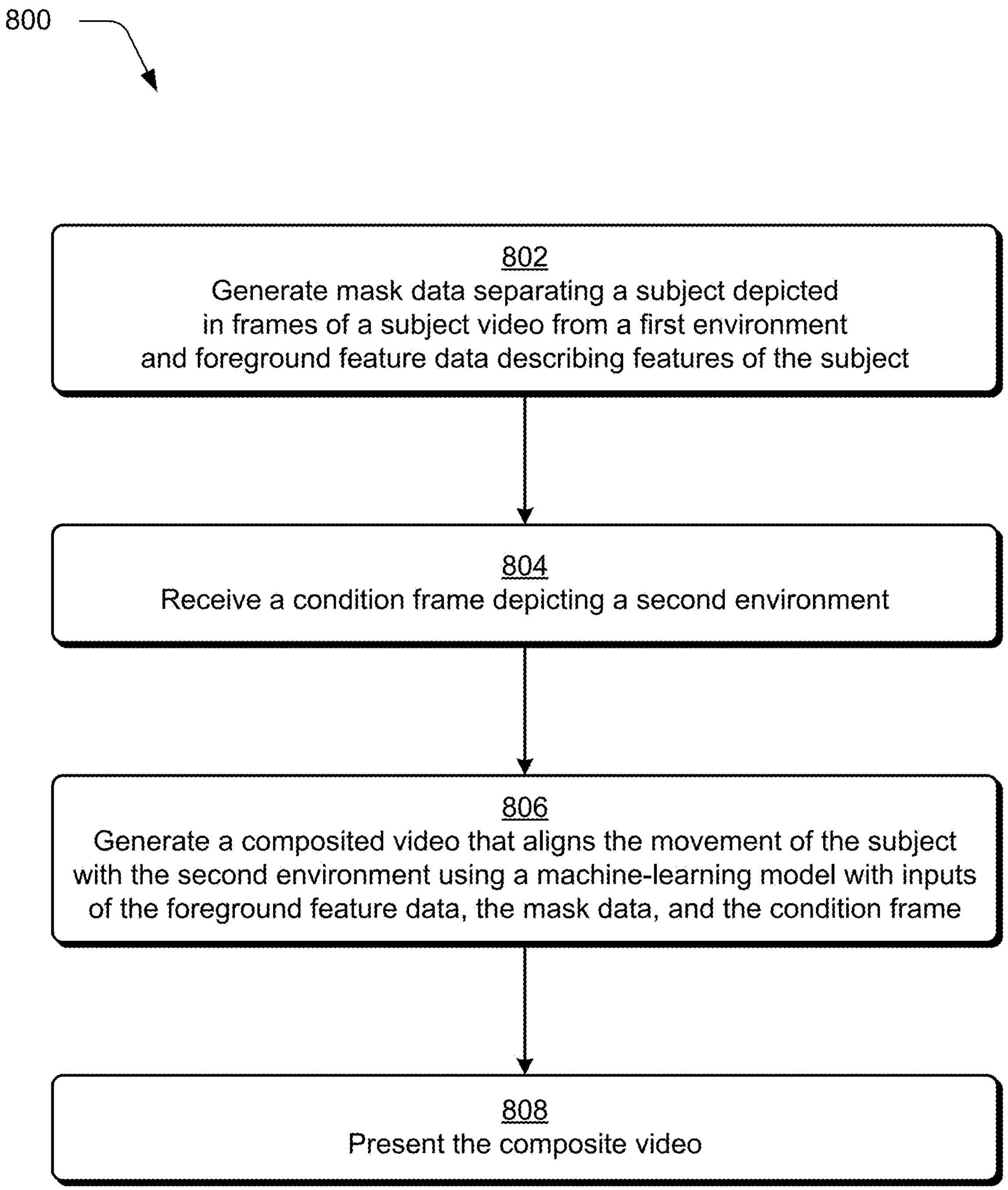
FIG. 8 is a flow diagram depicting an algorithm as a step-by-step procedure in an example implementation of operations performable for accomplishing a result of subject-aware video background generation.

FIG. 8 is a flow diagram depicting an algorithm as a step-by-step procedure 800 in an example implementation of operations performable for accomplishing a result of subject-aware video background generation. To begin in this example, mask data 210 and foreground feature data 208 are generated from a subject video 120 (block 802). The mask data 210 separates a subject in frames of the subject video 120 from a first environment of the subject video 120. The foreground feature data describes features of the subject. A condition frame 122 depicting a second environment different than the first environment is also received (block 804).

A composite video 124 is generated by a machine-learning model 118 that aligns the subject's movement with the second environment (block 806). The foreground feature data 208, mask data 210, and condition frame 122 are input to the machine-learning model 118. The machine-learning model 118 uses the condition frame 122 to generate and condition a depiction of the second environment in the compositive video. The composite video is then presented (block 808), e.g., for display in a user interface.

Example System and Device

Figure 9:
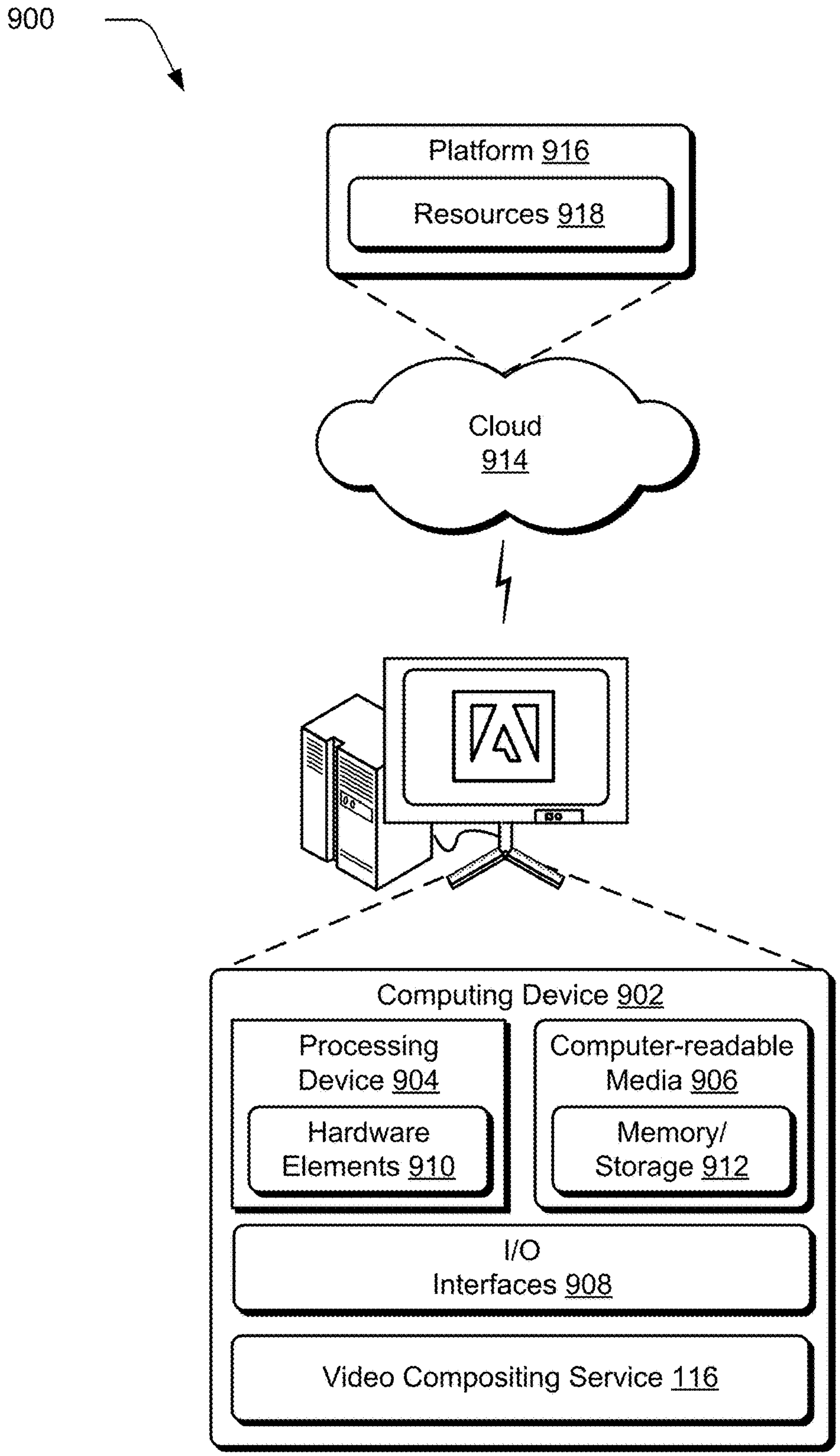
FIG. 9 illustrates an example system including various components of an example device that can be implemented as any type of computing device as described and/or utilize with reference to the previous figures to implement embodiments of the techniques described herein.

FIG. 9 illustrates an example system 900 that includes an example computing device 902 that is representative of one or more computing systems and/or devices that are usable to implement the various techniques described herein. This is illustrated through the inclusion of the video compositing service 116. The computing device 902 is configurable, for example, as a server of a service provider, a device associated with a client (e.g., a client device), an on-chip system, and/or any other suitable computing device or computing system.

The example computing device 902, as illustrated, includes a processing system 904, one or more computer-readable media 906, and one or more I/O interfaces 908 that are communicatively coupled, one to another. Although not shown, the computing device 902 further includes a system bus or other data and command transfer system that couples the various components from one to another. For example, a system bus includes any combination of different bus structures, such as a memory bus or memory controller, a peripheral bus, a universal serial bus, and/or a processor or local bus that utilizes various bus architectures. A variety of other examples are also contemplated, such as control and data lines.

The processing system 904 is representative of the functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. Memory/storage 912 represents memory or storage capacity associated with one or more computer-readable media. In one example, the memory/storage 912 includes volatile media (such as random access memory (RAM)) and/or nonvolatile media (such as read-only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways, as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways, as further described below, to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are stored on or transmitted across some form of computer-readable media. For example, the computer-readable media includes a variety of media accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal-bearing media. The computer-readable storage media includes hardware such as volatile and non-volatile, removable and non-removable media, and/or storage devices implemented in a method or technology suitable for storage of information such as computer-readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium configured to transmit instructions to the hardware of the computing device 902, such as via a network. Signal media typically embodies computer-readable instructions, data structures, program modules, or other data in a modulated data signal, such as carrier waves, data signals, or other transport mechanisms. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic, and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as hardware utilized to store instructions for execution, e.g., the computer-readable storage media described previously.

Combinations of the foregoing are also employable to implement various techniques described herein. Accordingly, software, hardware, or executable modules are implementable as instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through the use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through the use of a distributed system, such as over a "cloud" 914, as described below.

The cloud 914 includes and/or is representative of a platform 916 for resources 918. The platform 916 abstracts the underlying functionality of hardware (e.g., servers) and software resources of the cloud 914. For example, the resources 918 include applications and/or data that are utilized while computer processing is executed on servers remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources implemented via the platform. Accordingly, in an interconnected device embodiment, the implementation of functionality described herein is distributable throughout the system 1000. For example, the functionality is implementable in part on the computing device 902 as well as via the platform 916 that abstracts the functionality of the cloud 914.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

What is claimed is:

1. A method comprising:

generating, by a processing device, mask data that separates a subject depicted in frames of a subject video from a first environment and foreground feature data describing features of the subject;

receiving, by the processing device, a condition frame depicting a second environment, the second environment being different than the first environment;

generating, using a machine-learning model with inputs of the foreground feature data and the mask data, a composite video that aligns movement of the subject with the second environment, the machine-learning model using the condition frame to generate and condition a depiction of the second environment in the composite video that includes a background region synthesized to extrapolate the second environment beyond the condition frame to include one or more views of the second environment not depicted in the condition frame, the background region being aligned with movement of a camera viewpoint of the subject in the subject video; and presenting, by the processing device, the composite video via a user interface.

2. The method of claim 1, wherein:

the condition frame is a background-only image depicting the second environment without the subject;

the background region includes one or more environmental interactions responsive to the movement of the subject; and the machine-learning model is a generative diffusion model trained self-supervised on multiple training videos depicting example subject-scene interactions to extrapolate interactions between the subject depicted in the subject video and the second environment depicted in the condition frame into an extended space-time volume in generating the composite video depicting the subject interacting with the second environment.

3. The method of claim 2, wherein the generative diffusion model is further trained to infer camera motion from the frames of the subject video in generating the composite video with camera movement within the extended space-time volume of the second environment.

4. The method of claim 1, wherein the method further comprises generating, using an image encoder, a feature representation of the condition frame with background feature data being a last hidden layer of the feature representation, the background feature data being an input to the machine-learning model.

5. The method of claim 4, wherein:

the machine-learning model is a convolutional neural network; and the background feature data are injected through cross-attention layers of a denoising U-Net of the convolutional neural network.

6. The method of claim 1, wherein the method further comprises:

generating, for each frame of the subject video and using an instance segmentation machine-learning model, subject segmentations of the subject and subject masks that localize the subject using a bounding box;

encoding, using a variational autoencoder, the subject segmentations from a pixel space into a latent space as the foreground feature data, the foreground feature data including latent features of the subject; and downsampling the subject masks into the mask data to align with a size of the foreground feature data.

7. The method of claim 6, wherein:

a concatenation of the foreground feature data, the mask data, and Gaussian noises along a feature dimension in the latent space is input to the machine-learning model; and the method further comprises, during training of the machine-learning model, applying random rectangular cut-outs to the subject segmentations and the subject masks and performing image erosion on the subject segmentations and the subject masks with a uniform kernel.

8. The method of claim 7, wherein:

the latent features of the foreground feature data is included in four latent channels; and the Gaussian noises include noisy latent features in the four latent channels.

9. The method of claim 8, wherein:

the method further includes: reconstructing, using a decoder, a video output of the machine-learning model in the four latent channels into a pixel space of the composite video; and the concatenation forms a nine-channel input feature to the machine-learning model, the nine-channel input feature including the four latent channels of the foreground feature data, one channel of the mask data, and the four latent channels of the Gaussian noises.

10. The method of claim 1, wherein the condition frame includes a digital photograph of the second environment, a frame of a video depicting the second environment, or a digital image of the second environment generated using another machine-learning model or photo editing resources.

11. A computing device comprising:

a processing device; and a computer-readable storage medium storing instructions that, responsive to execution by the processing device, causes the processing device to perform operations including:

generating mask data that separates a subject depicted in frames of a subject video from a first environment and foreground feature data describing features of the subject;

generating background feature data from a condition frame depicting a second environment, the second environment being different than the first environment;

generating, using a machine-learning model with inputs of the foreground feature data and the mask data, a composite video that aligns movement of the subject with the second environment, the machine-learning model using the background feature data to generate and condition a depiction of the second environment in the composite video that includes a background region synthesized to extrapolate the second environment beyond the condition frame to include one or more views of the second environment not depicted in the condition frame, the background region being aligned with movement of a camera viewpoint of the subject in the subject video; and presenting the composite video via a user interface.

12. The computing device of claim 11, wherein the machine-learning model is a generative diffusion model trained self-supervised on multiple training videos depicting example subject-scene interactions to extrapolate interactions between the subject depicted in the subject video and the second environment depicted in the condition frame into an extended space-time volume in generating the composite video depicting the subject interacting with the second environment.

13. The computing device of claim 11, wherein:

the machine-learning model is a convolutional neural network; and the background feature data are injected through cross-attention layers of a denoising U-Net of the convolutional neural network.

14. The computing device of claim 13, wherein the computer-readable storage medium stores additional instructions that, responsive to execution by the processing device, causes the processing device to perform operations including:

generating, for each frame of the subject video and using an instance segmentation machine-learning model, subject segmentations of the subject and subject masks that localize the subject using a bounding box;

encoding, using a variational autoencoder, the subject segmentations from a pixel space into a latent space as the foreground feature data, the foreground feature data including latent features of the subject; and downsampling the subject masks into the mask data to align with a size of the foreground feature data.

15. The computing device of claim 14, wherein:

a concatenation of the foreground feature data, the mask data, and Gaussian noises along a feature dimension in the latent space is input to the convolutional neural network;

the latent features of the foreground feature data is included in four latent channels;

the Gaussian noises include noisy latent features in the four latent channels; and the computer-readable storage medium stores additional instructions that, responsive to execution by the processing device, causes the processing device to perform operations including reconstructing, using a decoder, a video output of the machine-learning model in the four latent channels into a pixel space of the composite video.

16. One or more computer-readable storage media storing instructions that, responsive to execution by a processing device, causes the processing device to perform operations comprising:

receive a subject video depicting a movement of a subject in a first environment and a condition frame depicting a second environment, the second environment being different than the first environment;

generate, using a machine-learning model, a composite video that aligns the movement of the subject with the second environment, inputs to the machine-learning model including mask data of the subject in frames of the subject video, foreground feature data describing latent features of the subject in the frames of the subject video, and background feature data describing latent features of the second environment and being used by the machine-learning model to generate and condition a depiction of the second environment in the composite video that includes a background region synthesized to extrapolate the second environment beyond the condition frame to include one or more views of the second environment not depicted in the condition frame, the background region being aligned with movement of a camera viewpoint of the subject in the subject video; and present the composite video via a user interface.

17. The one or more computer-readable storage media of claim 16, wherein the machine-learning model is a generative diffusion model trained self-supervised on multiple training videos depicting example subject-scene interactions to extrapolate interactions between the subject depicted in the subject video and the second environment depicted in the condition frame into an extended space-time volume in generating the composite video depicting the subject interacting with the second environment.

18. The one or more computer-readable storage media of claim 17, wherein the generative diffusion model is further trained to infer camera motion from the frames of the subject video in generating the composite video with camera movement within the extended space-time volume of the second environment.

19. The one or more computer-readable storage media of claim 16, wherein the condition frame includes a digital photograph of the second environment, a frame of a video depicting the second environment, or a digital image of the second environment generated using another machine-learning model or photo editing resources.

20. The one or more computer-readable storage media of claim 16, wherein:

the machine-learning model is a convolutional neural network; and the one or more computer-readable storage media store additional instructions that, responsive to execution by a processing device, cause the processing device to perform operations comprising generating, using an image encoder, a feature representation of the condition frame with background feature data being a last hidden layer of the feature representation, the background feature data being injected through cross-attention layers of a denoising U-Net of the convolutional neural network.

* * * * *